No. 687,374. Patented Nov. 26, 1901.
J. C. HAMER.
APPARATUS FOR DYEING, &c.
(Application filed May 7, 1901.)
(No Model.) 2 Sheets—Sheet 1.

Witnesses
Alfred Bosshardt
Stanley R Bramall

Inventor
John C. Hamer
per Ferd. Bosshardt,
Attorney.

No. 687,374. Patented Nov. 26, 1901.
J. C. HAMER.
APPARATUS FOR DYEING, &c.
(Application filed May 7, 1901.)
(No Model.) 2 Sheets—Sheet 2.

Witnesses
Alfred Bosshardt
Stanley R Bramall

Inventor
John C. Hamer
per Ferd. Bosshardt.
Attorney.

UNITED STATES PATENT OFFICE.

JOHN C. HAMER, OF RADCLIFFE, ENGLAND.

APPARATUS FOR DYEING, &c.

SPECIFICATION forming part of Letters Patent No. 687,374, dated November 26, 1901.

Application filed May 7, 1901. Serial No. 59,179. (No model.)

*To all whom it may concern:*

Be it known that I, JOHN CHARLES HAMER, a subject of the King of Great Britain, residing at Radcliffe, in the county of Lancaster, England,(whose post-office address is Withins House, Radcliffe aforesaid,) have invented new and useful Improvements in Apparatus for Dyeing and Otherwise Treating Fibrous Material in a Spun or other State, (for which I have made application for a patent in Great Britain, No. 4,280, dated February 28, 1901,) of which the following is a specification.

My invention relates to that type of apparatus for dyeing and otherwise treating fibrous material in a spun or other state wherein the material to be treated, without using perforated spindles or tubes, is packed in perforated baskets placed removably into a drum which has rotary motion imparted, and the liquor is passed through and the superfluous liquor afterward extracted from the material by the action of centrifugal force.

The object of my invention is to so construct the said type of apparatus that the liquor is more evenly distributed over the material to be treated and the necessity hitherto experienced of reversing the said baskets in the said rotary drum is dispensed with, as well as in some cases the use of the liquor-circulating pump, and the liquor is not liable to atomize. I attain these objects by the means illustrated in the accompanying drawings, in which—

Figure 1:
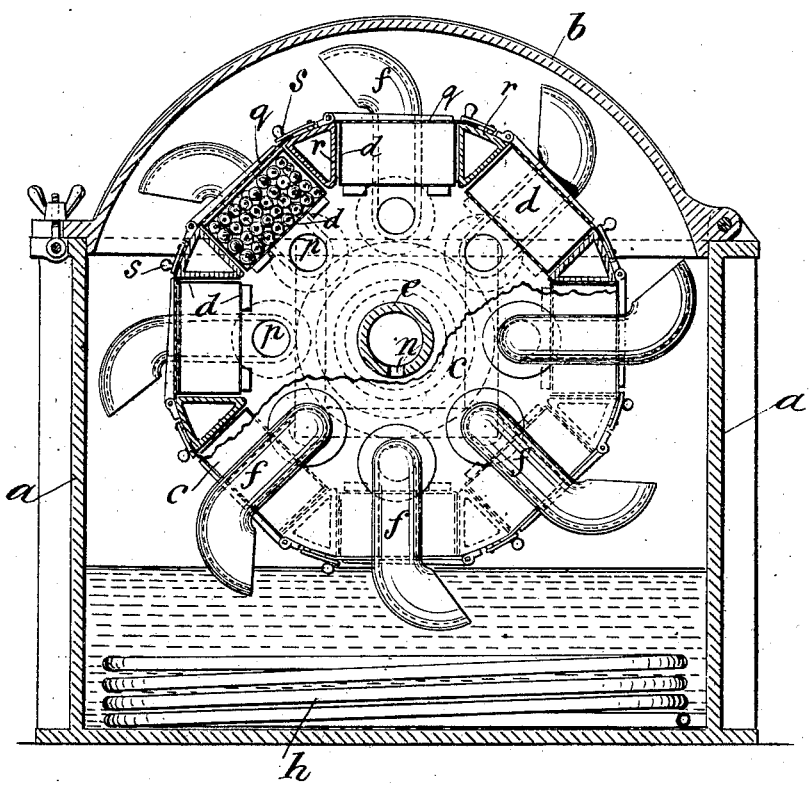
Figure 2:
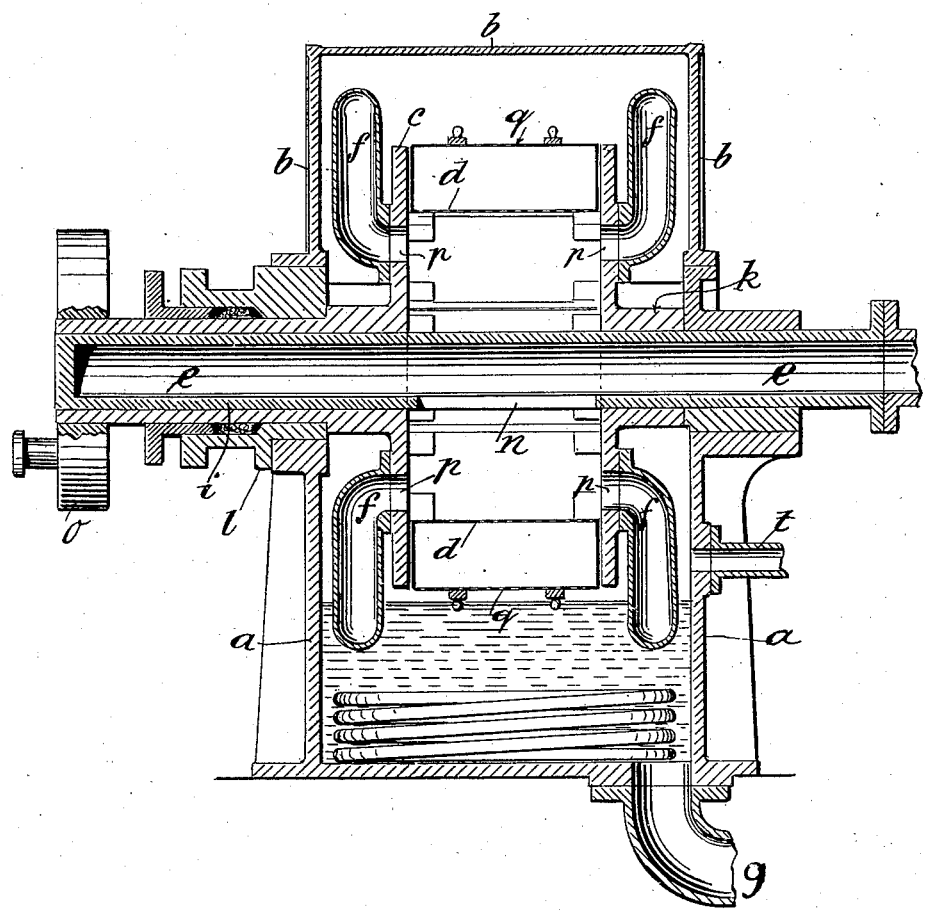

Figures 1 and 2 are respectively a cross and a longitudinal section.

Similar letters refer to similar parts throughout both views.

*a* is the liquor-tank; *b*, its cover; *c*, the rotary drum; *d*, baskets; *e* and *f*, the liquor-inlets; *g*, the liquor-outlet pipe, and *h* the steam-coil for heating the liquor, if required.

In carrying out my invention, and referring to the figures generally, in lieu of employing a drum provided with baskets to rotate in a horizontal plane I adapt such drum *c* to rotate the baskets *d* in a vertical plane. For this purpose I form or furnish each side of the drum *c* with a trunnion *i k*, respectively, *i* being mounted in the bearings *l*, formed on (or secured to) the tank *a* of the drum in which it revolves, and *k* on the stationary liquor-inlet pipe *e*, passing through the axis of the said drum and being at one end mounted in the trunnion *i* and at the other in the bearing *m* on the tank *a*. This pipe *e* is formed at its under side with perforations or a slot *n*, (or slots,) which extend across the whole length of the baskets *d*. One end of this pipe is closed, while the other is suitably connected with a liquor-pump, as will be readily understood without special illustration.

The trunnion at the closed end of the pipe *e* I furnish with a crank-disk *o*, to be driven direct from an engine, or a fast or loose pulley may be used and the drum thus driven indirect, as will be readily understood without illustration, whereby the said drum is rotated and can be stopped at will. Each drum side is formed with ports *p*, situated opposite each other between the pipe *e* and the bottom of the baskets *d*. To each of the said ports I secure, outside of the said drum, a pipe *f*, projecting a suitable distance from the periphery of the drum sides and adapted to dip into the liquor in the tank *a*, in which the drum revolves, and lift up liquor, which is discharged thereby onto the bottom of the baskets *d* from each end thereof, which arrangements enable me to work with a smaller quantity of liquor than hitherto has been the case.

The liquor used for treating the material in the baskets *d* may be discharged upon the bottom thereof either by the liquor-pump forcing it through the perforated or slotted pipe *e* or by the lifting-tubes *f* only, or by both, as the nature of the material may require. When the drum *c* is rotated, the centrifugal action set up thereby causes the liquor ejected upon the bottom of the baskets *d* to be forced through the baskets—*i. e.*, the material therein—back into the tank *a*. This operation is continued until the material in the baskets has been treated sufficiently, after which the liquor-supply is cut off and the superflous liquor whizzed out of the material. The tank is furnished with a cover *b*, preferably hinged thereto, which prevents the liquor splashing, and when thrown back allows the baskets *d*,filled with material to be treated, being readily placed into and removed from the drum *c*. The baskets *d* have each a lid *q*, one side of which is hinged to the cross-pieces *r* of the drum *c* and the other secured thereto by a catch *s*, which lid also serves to keep the baskets in the drum c. (See Fig. 1.) By a pipe t the tank a may be also connected with an air-pump, (not shown,) which besides serving for the extraction of the superflous liquor from the material may, if necessary, also be used for creating a vacuum in the apparatus previous to admitting the liquor into the tank a.

What I claim as my invention, and desire to secure by Letters Patent, is—

1. In apparatus for dyeing and otherwise treating fibrous material in a spun or other state, in combination a liquor-tank a having a liquor-outlet g, a drum c adapted to rotate in a vertical plane in the said tank, a stationary liquor-supply pipe e passing through the axis of the said drum, the latter carrying in its periphery perforated baskets d for holding the material to be treated and the said inlet-pipe having perforations m adapted to eject the liquor downward against the bottom of the said baskets, all substantially as set forth.

2. In apparatus for dyeing and otherwise treating fibrous material in a spun or other state, in combination a liquor-tank a having a liquor-outlet g, a drum c adapted to rotate in a vertical plane in the said tank, a stationary liquor-supply pipe e passing through the axis and liquor-lifting pipes f at the sides of the said drum, the latter carrying in its periphery perforated baskets d holding the material to be treated, the said inlet-pipe having perforations m and the lifting-pipes f communicating with the interior of the drum, the former being for ejecting the liquor downward and the latter lifting the same from the tank upon the bottom of the said baskets, all substantially as set forth.

In witness whereof I have hereunto set my hand in presence of two witnesses.

JOHN C. HAMER.

Witnesses:
ALFRED BOSSHARDT,
STANLEY E. BRAMALL.